United States Patent [19]

Gandhi et al.

[11] Patent Number: 5,603,548
[45] Date of Patent: Feb. 18, 1997

[54] PUSH-OUT VEHICLE SIDE DOOR

[75] Inventors: Umesh N. Gandhi, Grand Blanc; Douglas J. Osmak, Clarkston; Mark E. Farmer, Waterford; Patricia L. Harmon, Rochester Hills, all of Mich.

[73] Assignee: General Motors Corporation, Detroit, Mich.

[21] Appl. No.: 543,775

[22] Filed: Oct. 16, 1995

[51] Int. Cl.$^6$ ............................... B60J 5/04; B60R 21/02
[52] U.S. Cl. ................ 296/146.7; 49/502; 280/748; 296/39.1; 296/189
[58] Field of Search ..................... 296/189, 188, 296/146.7, 146.6, 39.1; 280/748, 751; 49/502, 503; 293/132, 133

[56] References Cited

U.S. PATENT DOCUMENTS

| | | | |
|---|---|---|---|
| 3,582,134 | 6/1971 | Shaff | 296/146 |
| 3,791,693 | 2/1974 | Hellriegel et al. | 296/146 |
| 3,868,796 | 3/1975 | Bush | 52/618 |
| 3,964,208 | 6/1976 | Renner et al. | 49/502 |
| 3,989,275 | 11/1976 | Finch et al. | 280/751 |
| 4,272,103 | 6/1981 | Schmid et al. | 280/751 |
| 4,369,608 | 1/1983 | Miura et al. | 52/309.9 |
| 4,769,951 | 9/1988 | Kaande | 49/502 |
| 4,786,100 | 11/1988 | Kleemann et al. | 296/146 |
| 5,000,509 | 3/1991 | Sinnhuber et al. | 296/188 |
| 5,040,335 | 8/1991 | Grimes | 49/502 |
| 5,048,234 | 9/1991 | Lau et al. | 49/502 |
| 5,066,064 | 11/1991 | Garnweidner | 296/146 |
| 5,102,163 | 4/1992 | Ishikawa | 280/751 |
| 5,110,176 | 5/1992 | Curtis | 296/188 |
| 5,117,549 | 6/1992 | Gaudreau | 29/458 |
| 5,169,204 | 12/1992 | Kelman | 296/146 D |
| 5,277,441 | 1/1994 | Sinnhuber | 280/730 R |
| 5,306,066 | 4/1994 | Saathoff | 296/146.6 |
| 5,328,234 | 7/1994 | Daniel et al. | 297/216.16 |
| 5,395,135 | 3/1995 | Lim et al. | 280/751 |
| 5,421,925 | 6/1995 | Kulaszewicz et al. | 156/73.5 |
| 5,437,753 | 8/1995 | Ugolini | 156/214 |
| 5,482,344 | 1/1996 | Walker et al. | 296/146.7 X |

FOREIGN PATENT DOCUMENTS

| | | | |
|---|---|---|---|
| 4228626 | 3/1994 | Germany . | |
| 4338249 | 5/1994 | Germany | 296/146.6 |
| 4-362415 | 12/1992 | Japan . | |
| 1441598 | 7/1976 | United Kingdom . | |
| 2271534 | 4/1994 | United Kingdom . | |

*Primary Examiner*—David M. Mitchell
*Assistant Examiner*—Kia M. Robinson
*Attorney, Agent, or Firm*—Ernest E. Helms

[57] ABSTRACT

An automotive vehicle door is provided having a first generally rigid outer structure; a second generally rigid inner structure spaced from the outer structure, the second inner structure having a guide opening; an interior trim panel connected to the second generally rigid inner structure; and a target having a first section generally adjacent the outer structure. A second section substantially smaller than the first section extends from the first section and has a cross-sectional area small enough for passage through the guide opening. Therefore, an impact on the outer door panel causes the target section to protrude inwardly through the inner structure opening, causing the trim panel to protrude inwardly.

9 Claims, 3 Drawing Sheets

PUSH-OUT VEHICLE SIDE DOOR

FIELD OF THE INVENTION

The field of the present invention is that of apparatuses and methods of utilization thereof of vehicle side doors.

BACKGROUND OF THE INVENTION

Beyond the utilization of side impact beams, there have been various other approaches utilized to aid in the mitigation of possible injury to vehicle occupants in side impacts. One method is to increase the padding material inside the vehicle. Interior padding on the vehicle door is limited since increasing the interior padding on the door also diminishes the interior space available within the vehicle.

Another method is to provide a honeycomb structure between inner and outer panels of the vehicle. This structure is disadvantageous because it greatly adds complexity to manufacturing, often requiring many more welds. Additionally, such structures can substantially increase the weight of the door. The weight of the door works to diminish the environmental efficiency of the vehicle.

Another technique to protect the vehicle occupant is to add an energy-absorbing material between the inner and outer door structures. This technique is limited by the amount of space between the inner and outer panels, and it is often not sufficient to place the amount of energy-absorbing material as desired. Also, if the energy-absorbing material placement arrangement between the inner and outer door structures is incorrectly designed, the arrangement may even further contribute to increased injury to the vehicle occupant.

It is desirable to improve upon the above-mentioned three techniques of passenger protection while at the same time minimizing vehicle weight and manufacturing complexity.

SUMMARY OF THE INVENTION

Gandhi et al, U.S. Ser. No. 08/353,761, commonly assigned, provides an alternative to the three above-mentioned techniques by providing a vehicle door with rigid inner and outer panel structures. The inner panel structure has an opening. Suspended between the inner and outer panels adjacent to the opening in the inner panel, in a preferred embodiment, is a compliant target. Upon a side impact of the vehicle door, the target will protrude through the opening in the inner panel, ideally contacting a seated vehicle occupant in the pelvic region (via a more compliant door trim panel), thereby directing the initial impact on the vehicle occupant to the portion of the body most capable of sustaining the impact without serious injury and thereafter causing the vehicle occupant to be further away from the door as the door crumbles because of the side impact on the vehicle.

The present invention provides a vehicle door which can provide a technique similar to that described in Gandi et al but being more suitable for front vehicle doors with fully extendable and retractable windows.

DESCRIPTION OF THE PREFERRED EMBODIMENT

Figure 1:
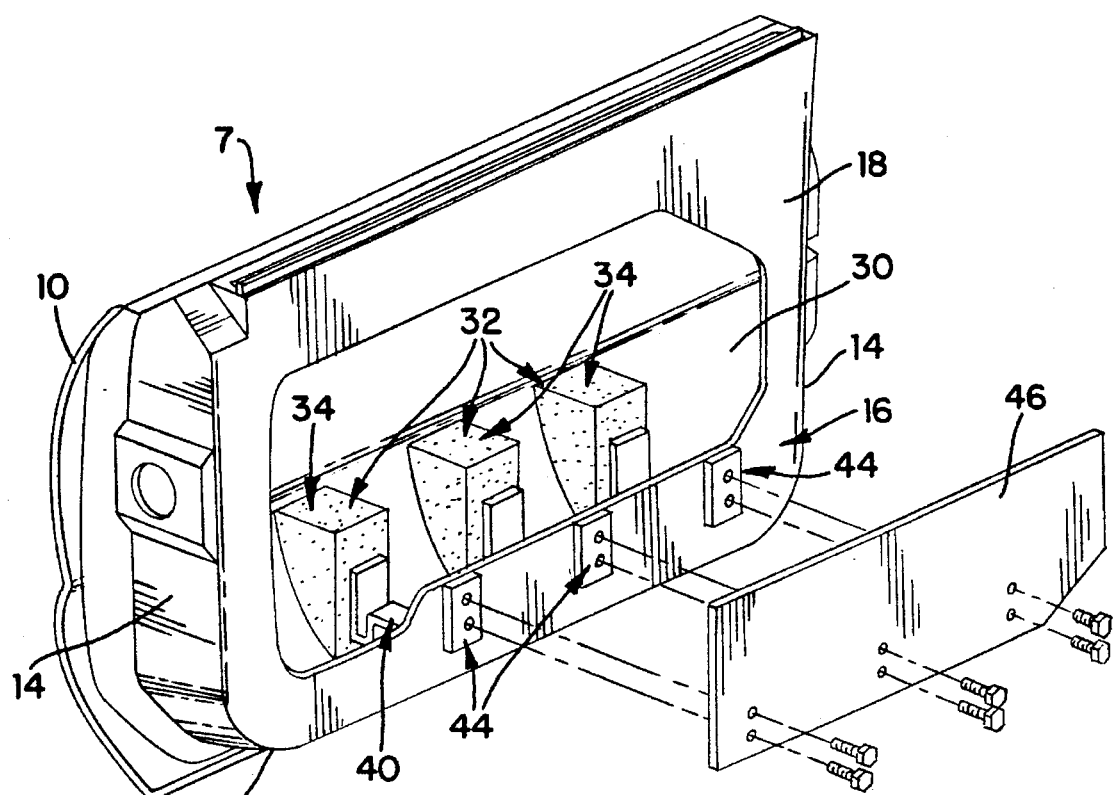
FIG. 1 is an exploded perspective view of a right-hand front door according to the present invention with an inner trim panel and portions of the door hardware removed for clarity of illustration.
Figure 2:
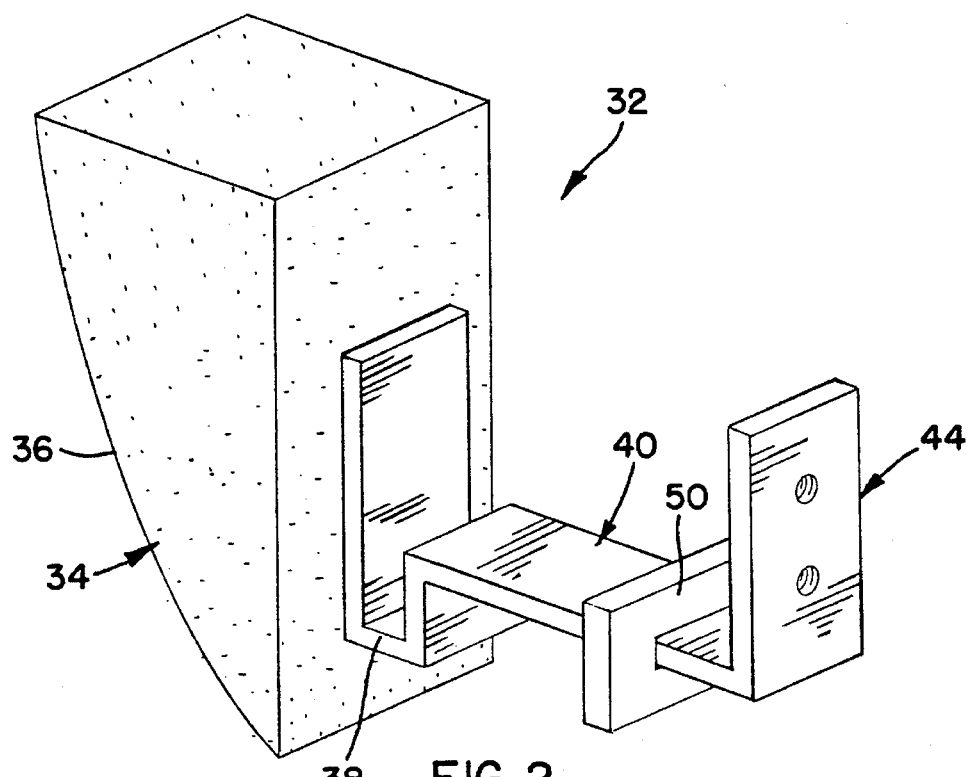
FIG. 2 is an enlarged view of a target utilized in the vehicle door shown in FIG. 1.
Figure 3A:
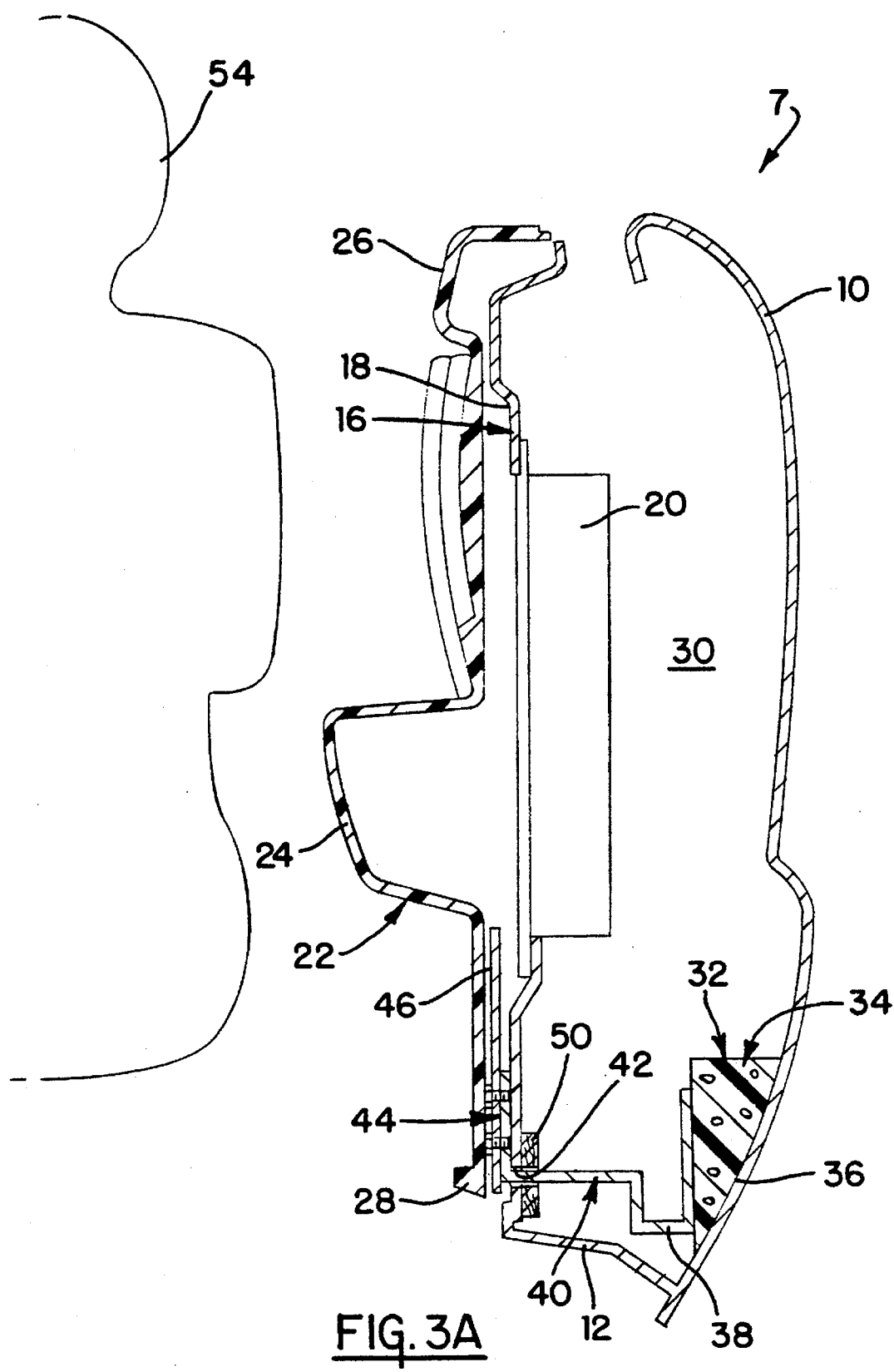
FIGS. 3A, 3B and 3C are sectional views of the door shown in FIG. 1, illustrating deformation of the door due to a side impact.

Referring to FIGS. 1 through 3, the door 7 has a typical rigid steel, plastic or fiberglass outer door panel 10. Joined to the outer door panel 10 by a floor 12 and side panels 14 is an inner panel 16. Typically, the floor 12, side panels 14 and inner panel 16 will be fabricated from a common stamping, sometimes referred to in the industry as the "door inner." The inner panel 16 is spaced from the outer panel 10. The inner panel 16 is principally comprised of two members, an outer peripheral member 18 and a module hardware member 20 which includes a window regulator mechanism.

The vehicle door 7 has an ornamental interior trim panel 22 which is typically made from a generally rigid foam polyurethane material covered with an appropriate vinyl or cloth membrane skin. The interior trim panel 22 has a crushable arm rest portion 24. The interior trim panel 22 will typically be connected to the inner door structure 18 by appropriate fasteners (not shown) somewhere along its top end 26 and along its bottom end 28.

Located primarily within the cavity 30 formed between the outer and inner door structures 10 and 16 is a target 32. The target 32 has a first section 34 formed by an elasto-polypropylene foam material typically having a density of 6 to 8 lbm/cu ft. The first section 34 has a surface 36 generally aligned with the contour of the outer door panel 10. The surface 36 is glued to the outer panel 10 to hold the target 32 in position. The first section 34 also has a steel portion having a lower U-shaped section 38 which can accommodate an extendable window (not shown) from its retracted position. Joined to the U-shaped portion 38 of the target first section is a second section 40 which extends from the first section 34 and has a cross-sectional area small enough to allow it to pass through a guide opening 42 provided along the lower outer periphery of the inner door panel 16. Typical cross-sectional dimensions of the second section 40 are 4 mm by 30–40 mm. The target 32 also has a third section 44 joined to the second section 40. The third section 44 is juxtaposed between the interior trim panel 22 and the inner door panel 16. To help distribute any load placed upon the interior trim panel, there is a backing plate 46 juxtaposed between the target third section 44 and the interior trim panel 22.

To provide reinforcement adjacent the guide opening 42 and the interior panel 18, there is provided a guide block 50 made from wood, plastic or other suitable material which is stiff with a slippery surface. The guide block must also withstand loading of 50 N/mm.

Since the exact position of a side impact is never known, vehicle door 7 has multiple targets 32 which have third sections all joined to the backing plate 46. Virtually any side impact will cause movement of at least two targets 32.

Figures 3B, 3C:
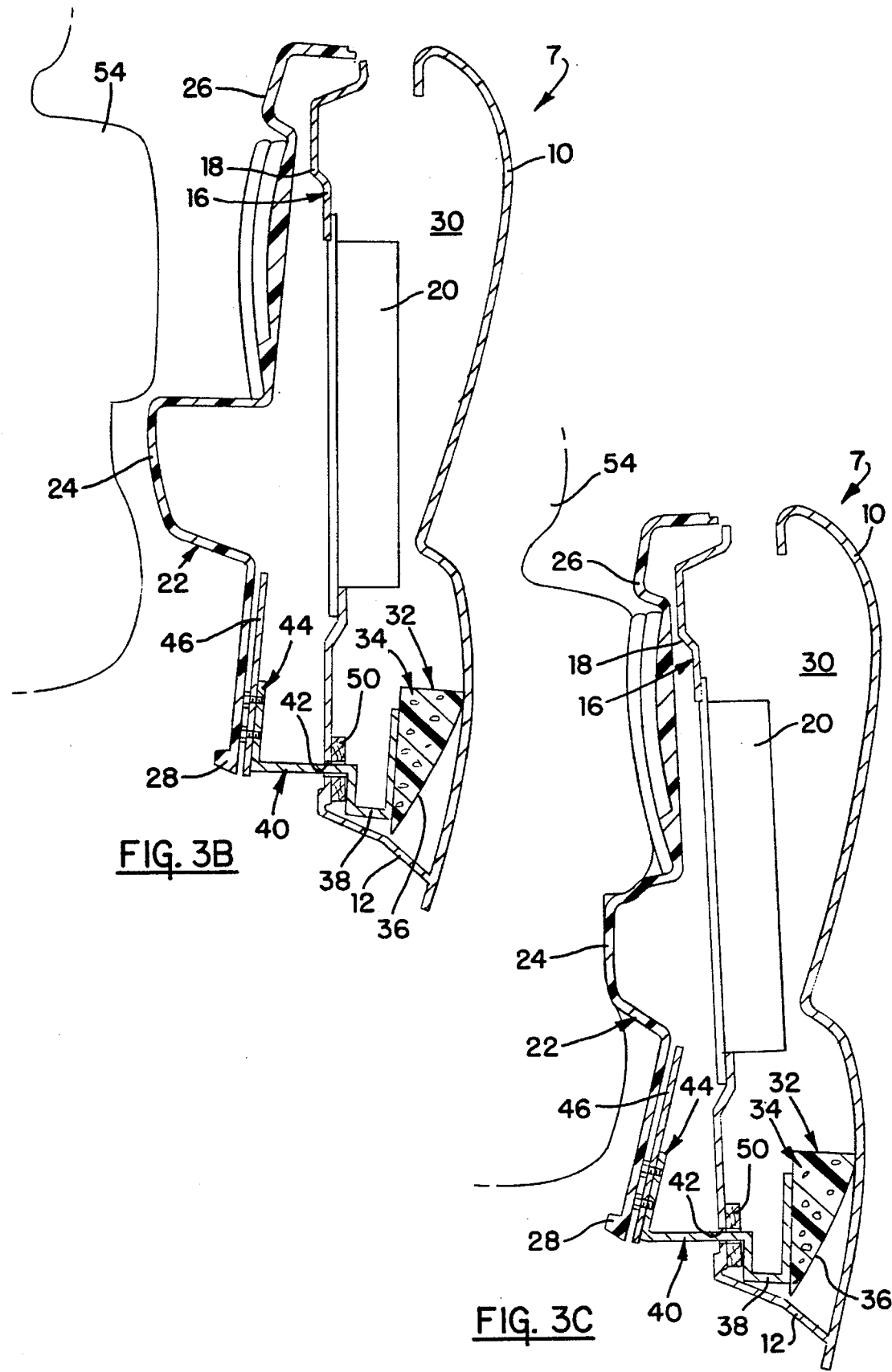

Upon a side impact situation as shown in FIGS. 3B and 3C, the target 32 will be dislodged inwardly from the outer door panel 10, causing the target second section 40 to protrude inwardly. The inward movement of the target 32 will cause the trim panel lower end 28 to dislodge from the inner panel 16. The trim panel 22 will dislodge within 4–5 mm inward motion of the target 32. The 4–5 mm motion of the target will occur in about 0.5 msec after impact. The fasteners utilized will typically be sized and positioned such that the lower end 28 of the trim panel will always separate from the inner panel 16 before the upper end 26 of the trim panel 22. The fasteners on the upper end are typically sized to hold the trim panel 22 to the inner panel 16 under a pull down force of up to 12,000N. It is preferable as shown in FIG. 3B that there initially be as little deformation as possible of the target 32 until such time that the trim panel loads a seated occupant 54. The above results in a unique situation where the upper end 26 of the trim panel 22 is held at the upper end 18 of the inner door panel 16 while the trim panel lower end 28 is separated from the door inner panel 16 but attached to the target 32 that has moved inboard. The trim panel 22 held at upper end 26 and lower end 28 acts like a stretch membrane with a free space in the back or right (stretching is one of the most efficient methods to control the force). As the door outer panel 10 moves inboard during the impact, the trim panel 22 will contact the occupant 54 and load the occupant 54 in the pelvis and then push the occupant 54 away from the door inner panel 16 (which is typically metallic and far less compliant). The force to the occupant 54 from the trim panel 22 is initially controlled by the deformation (stretch) of the trim panel 22 and the crushable arm rest 24.

As shown in FIG. 3C, after loading of the trim panel 22 by the seated occupant, interaction force is limited by deformation of the target 32, specifically the third section with respect to the second section by plastic pivotal movement inwardly and also by plastic deformation of the metal portion of the target second section 40 and first section 34 as well as crushing of the first section 34 foam material. Most deformation will occur after a force loading of approximately 4000N.

It has been found that the inclusion of the target according to the present invention typically provides an improvement both in thoracic trauma index and in pelvic impact.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An automotive vehicle door structure comprising:

a first generally rigid outer structure;

a second generally rigid inner structure spaced from the outer structure, the second inner structure having a guide opening;

an interior trim panel connected to the second generally rigid inner structure; and a target having a first section generally adjacent the outer structure, a second section substantially smaller than the first section extending from the first section having a cross-sectional area small enough for passage through the guide opening and the target has a third section connected with the second section and the third section being juxtaposed between the trim panel and the rigid inner structure, and whereupon an impact on the rigid outer structure causes the target second section to protrude inwardly through the rigid inner structure opening, causing the trim panel to protrude inwardly.

2. An automotive vehicle door structure as described in claim 1 further including a backing plate juxtaposed between the third section of the target and the interior trim panel for distribution of force upon the interior trim panel.

3. An automotive vehicle door structure as described in claim 1 having a plurality of said targets and wherein the third sections are structurally joined to one another.

4. An automotive vehicle door structure as described in claim 2 with a plurality of targets and wherein the backing plate structurally connects the targets together.

5. An automotive vehicle door structure as described in claim 1 wherein the guide opening is formed in a block made from a plastic material.

6. An automotive vehicle door structure as described in claim 1 wherein the first section of the target has at least one surface generally aligned with the contour of the first outer structure.

7. An automotive vehicle door structure comprising:

a first generally rigid outer structure;

a second generally rigid inner structure spaced from the outer structure and joined to the outer structure, the second inner structure having a guide opening;

an interior trim panel connected to the second generally rigid inner structure; and a target having a first section generally adjacent the first outer structure, the target having a second section substantially smaller than the first section having a cross-sectional area small enough for passage through the guide opening, and the target having a third section juxtaposed between the interior trim panel and the second inner structure with a connected backing plate juxtaposed between the third section and the interior trim panel, whereupon an impact on the rigid outer structure causes the target second section to protrude, causing the interior trim panel to protrude inwardly.

8. An automotive vehicle door structure comprising:

a first generally rigid outer structure;

a second generally rigid inner structure spaced from the outer structure, the second inner structure having a guide opening;

an interior trim panel connected to the second generally rigid inner structure; and a target having a first section generally adjacent the outer structure, the first section also having a U-shaped section with the open end of the U being positioned generally upward for acceptance of an extendable window in a lowered position, and the target having a second section substantially smaller than the first section extending from the first section having a cross-sectional area small enough for passage through the guide opening, whereupon an impact on the rigid outer structure causes the target second section to protrude inwardly through the rigid inner structure opening, causing the trim panel to protrude inwardly.

9. An automotive vehicle door structure comprising:

a first generally rigid outer structure;

a second generally rigid inner structure spaced from the outer structure, the second inner structure having a guide opening formed in a block of plastic material;

an interior trim panel connected to the second generally rigid inner structure; and a target having a first section generally adjacent the outer structure, a second section substantially smaller than the first section extending from the first section having a cross-sectional area small enough for passage through the guide opening, whereupon an impact on the rigid outer structure causes the target second section to protrude inwardly through the rigid inner structure opening, causing the trim panel to protrude inwardly.

\* \* \* \* \*